United States Patent [19]

Lam et al.

[11] Patent Number: 5,229,086

[45] Date of Patent: Jul. 20, 1993

[54] REMOVAL OF MOLYBDENUM FROM URANIUM-BEARING SOLUTIONS

[75] Inventors: Edmond K. Lam, Saskatoon; Manfred G. Neven, Blind River; Robert A. Steane; Kenneth F. Ko, both of Saskatoon, all of Canada

[73] Assignees: Cameco; Uranerz Exploration & Mining Ltd., both of Saskatoon, Canada

[21] Appl. No.: 673,124

[22] Filed: Mar. 20, 1991

[30] Foreign Application Priority Data

Sep. 13, 1990 [CA] Canada ................................ 2025165

[51] Int. Cl.$^5$ ...................... C01G 39/00; C01G 43/00
[52] U.S. Cl. .................................... 423/54; 423/53; 423/55; 423/18
[58] Field of Search ................. 423/54, 53, 55, 18

[56] References Cited

U.S. PATENT DOCUMENTS

| | | | |
|---|---|---|---|
| 3,341,305 | 9/1967 | Kreevoy et al. | 423/54 |
| 3,449,066 | 6/1969 | Swanson | 423/54 |
| 3,950,487 | 4/1976 | Pemsler et al. | 423/24 |
| 4,026,988 | 5/1977 | Wells et al. | 423/54 |
| 4,303,620 | 12/1981 | Rendall et al. | 423/6 |
| 4,304,757 | 12/1981 | Kuehl et al. | 423/15 |
| 4,405,566 | 9/1983 | Weir et al. | 423/15 |

FOREIGN PATENT DOCUMENTS 0209470  1/1987  European Pat. Off. .

OTHER PUBLICATIONS

"The Extractive Metallurgy of Uranium", Robert C. Merritt, Colorado School of Mines Research Inst., 1971, pp. 199-200, 211-215, 344-345.

*Primary Examiner*—Theodore Morris
*Assistant Examiner*—P. C. Hailey
*Attorney, Agent, or Firm*—Cahill, Sutton & Thomas

[57] ABSTRACT

A process for removing molybdenum from uranium bearing solutions reduces molybdenum contamination of uranium product. The process employs solvent extraction techniques to remove molybdenum by using a molybdenum-selective extraction reagent of the chelating hydroxy-oxime type. The molybdenum-loaded extractant is stripped with dilute alkali for reuse. Where the uranium bearing solution originates from a solvent extraction process, a pretreatment stage is applied using an agent to remove entrained uranium extractant.

26 Claims, 4 Drawing Sheets

REMOVAL OF MOLYBDENUM FROM URANIUM-BEARING SOLUTIONS

BACKGROUND OF THE INVENTION

This invention relates to the removal of molybdenum from uranium-bearing solutions. Typically these solutions contain high concentrations of uranium and low concentrations of molybdenum.

Extraction of uranium from its ores is commonly carried out by processes which include leaching the ore or a concentrate thereof. Many uranium ores also contain molybdenum and, in such cases, leaching yields a solution which contains both uranium and molybdenum along with other impurities such as iron, aluminum, calcium, colloidal silica, etc. The dissolved uranium is usually separated from the leach solutions by an ion exchange or solvent extraction process. This produces a purified uranium-containing solution from which uranium is recovered by precipitation.

It is often difficult, however, to obtain an uncontaminated uranium product when the leach solution also contains dissolved molybdenum. The molybdenum is coextracted with the uranium in both the ion exchange and solvent extraction processes and is subsequently coprecipitated with the uranium.

Various proposals have been made and employed by the industry to deal with the problem of molybdenum contamination, but such proposals have various disadvantages. For example, both uranium and molybdenum may be stripped from the loaded resin or extractant by sodium carbonate solution and the uranium may be selectively precipitated by sodium hydroxide. Although the precipitated uranium product obtained is relatively free of molybdenum, the sodium content in the product can render it undesirable. Furthermore, the presence of sodium in the resulting effluent can present an environmental problem.

Another proposal is to selectively strip uranium from a loaded resin or extractant by an acidified sodium or potassium chloride solution. Although adequate separation of uranium and molybdenum can be achieved in this way, the resulting effluent of this process contains an undesirable amount of sodium chloride.

U.S. Pat. No. 4,405,566 (Weir et al.) discloses a process for recovering uranium values from a sulphate solution containing dissolved uranium and molybdenum and with a pH not exceeding about 5.5. It includes reacting the solution with ammonia at a pH in the range of from 8 to about 10, with resultant precipitation of uranium values relatively uncontaminated by molybdenum. This process, however, requires large amounts of ammonia and elaborate ventilation facilities.

The most commonly used method of extracting uranium from an ore is a sulphuric acid and oxidant leach process followed by either filtration or counter-current decantation washing of the leach residues. Ion exchange or solvent extraction is used to selectively recover uranium from the leach solution. Subsequently, the uranium is stripped from the loaded resin or extractant and precipitated and separated from the strip solution as a solid uranium compound. If the ore and subsequent leach solution contain molybdenum, it is extracted, stripped and precipitated together with the uranium, thus contaminating the uranium product.

A typical extraction process, involving solvent extraction, is carried out as follows. The uranium-containing ore is leached with sulphuric acid to produce an acidic solution containing dissolved uranium and impurities. The acidic solution, which is an aqueous phase, is then mixed with an immiscible amine phase. The amine phase is comprised of a trialkylamine, for example Alamine 336 (trade-mark), dissolved in kerosene and a small amount of isodecanol. Mixing of the aqueous and amine phases exposes the amine phase to most of the uranium dissolved in the aqueous phase. Since the uranium has a greater affinity for the amine phase than the aqueous phase, the uranium, but not most of the impurities, is extracted from the aqueous phase into the amine phase. After mixing, the mixture is allowed to settle whereby the amine phase containing dissolved (extracted) uranium separates from the aqueous phase by rising to the top of the aqueous phase. The amine phase is then removed, leaving behind the aqueous phase containing impurities which were not extracted by the amine phase. Since the extraction by the amine phase does not completely remove all of the uranium from the aqueous phase, the aqueous phase remaining after extraction is subjected to further similar extraction steps, each of which removes more uranium from the aqueous phase. After four such extraction steps, over 99% of the uranium has been extracted from the aqueous phase.

The amine phase containing dissolved uranium and now fewer impurities is then subjected to an extraction step with a weak acid solution in order to remove arsenic impurities. After the amine phase has settled away from the acid solution containing extracted arsenic, the amine phase is subjected to a further extraction step wherein a slightly acid solution of ammonium sulphate is mixed with the amine phase. This extracts the uranium. After mixing, the acid solution phase separates from the amine phase. The acid solution containing the extracted uranium is referred to as the "loaded strip solution". This is treated with ammonia to precipitate uranium yellowcake product. Such product is, however, contaminated with molybdenum if the ore contained molybdenum.

SUMMARY OF THE INVENTION

The present invention is based on the discovery that molybdenum can be removed from uranium-bearing solutions by subjecting these solutions to a solvent extraction process employing a molybdenum-selective extractant. The extractant is a chelating hydroxy-oxime reagent (sometimes referred to herein as CHOR). The CHOR selectively extracts the contaminating molybdenum from the uranium-bearing solution and renders the resulting solution relatively free of molybdenum. After scrubbing with water or acidified water, the molybdenum-loaded CHOR is subjected to a stripping stage with a dilute alkali solution such as sodium or potassium hydroxide to remove the molybdenum and then is reused for molybdenum extraction. This process is applicable directly to uranium leach solutions and ion exchange eluates.

If solvent extraction is used to recover the uranium from the leach solution a pretreatment stage is required to remove any entrained uranium extractant prior to the molybdenum extraction with the CHOR. A blend of kerosene and isodecanol of similar ratio as used in the uranium solvent extraction circuit, or kerosene alone, is used in at least one and preferably two or three counter-current extraction stages for the removal of the entrained uranium extractant. The resulting organic stream is used as makeup in the uranium circuit and the uranium-bearing loaded strip solution goes to the molybdenum extraction stage.

The invention may also be applied by a solvent extraction process using a mixture of the CHOR and a tertiary amine organic to simultaneously extract the uranium and molybdenum from the leach solution. Uranium is then selectively stripped from the organic mixture with ammonium sulphate solution. Ammonia is added to maintain the pH at 3.0–5.5. The uranium-loaded strip solution is sent for further processing. The uranium-depleted organic mixture, after scrubbing with water or acidified water, is subjected to a molybdenum stripping stage with a dilute alkali solution such as sodium or potassium hydroxide. The barren organic mixture is sent to the extraction stage for reuse.

BRIEF DESCRIPTION OF THE DRAWINGS

Embodiments of the invention will now be described with reference to the accompanying drawings, of which.

DESCRIPTION OF THE PREFERRED EMBODIMENTS

The invention can be used on uranium leach solutions. It can be used together with either a solvent extraction or an ion exchange uranium extraction circuit. It can be also used as one solvent extraction circuit when a mixture of CHOR and amine is employed.

With the present invention, substantially all the molybdenum can be removed from uranium-bearing solutions by contacting the solution with chelating hydroxy-oxime reagent (CHOR). A commercially available form of CHOR which is useful in the practice of the invention is LIX-63 (trade-mark) sold by Henkel Corporation. The active component of LIX-63 is 5, 8-diethyl-7-hydroxydodecane-6-oxime, an aliphatic hydroxyoxime compound. This compound was reported in A. W. Ashbrook and K. E. Hague, "CHELATING SOLVENT EXTRACTION REAGENTS VI. LIX 63; PURIFICATION, STRUCTURE AND PROPERTIES", Jul. 1975, Canada Center for Mineral and Energy Technology, Scientific Bulletin CM 75-9. It is believed that the proximity in the molecule of the NOH and OH groups is responsible for its chelating properties. For this reason, it is expected that most aliphatic and aromatic hydroxy-oximes will be useful in the practice of the invention, and it is a simple matter of trial and error to select ones with the desired utility.

In using the CHOR, it is advantageous to maintain the pH of the aqueous solution below 3.0 to effect a high selectivity for molybdenum. The aqueous and organic mixture is then allowed to separate into its respective phases. The resultant CHOR organic contains substantially all the molybdenum and virtually no uranium. The uranium-bearing aqueous solution has now been purified and can be further processed. Prior to stripping the molybdenum from the CHOR organic, it is scrubbed with water or acidified water, in order to minimize uranium losses due to entrainment. The scrubbed CHOR organic is then mixed with a diluted alkali solution at a pH of at least 11 and, preferably above 12, to effect the molybdenum stripping. The organic and aqueous mixture is again allowed to separate into its respective phases. The stripped CHOR is recycled to the extraction step for reuse. The spent strip aqueous solution can be further processed or discarded as desired.

The molybdenum contaminated uranium-bearing solution may contain up to 70 kg.m$^{-3}$ (g/L) $U_3O_8$, and from 0.01 up to several kg.m$^{-3}$ (g/L) molybdenum. The process may be carried out at ambient or elevated temperature and pressure compatible with the kerosene solvent used.

Figure 2:
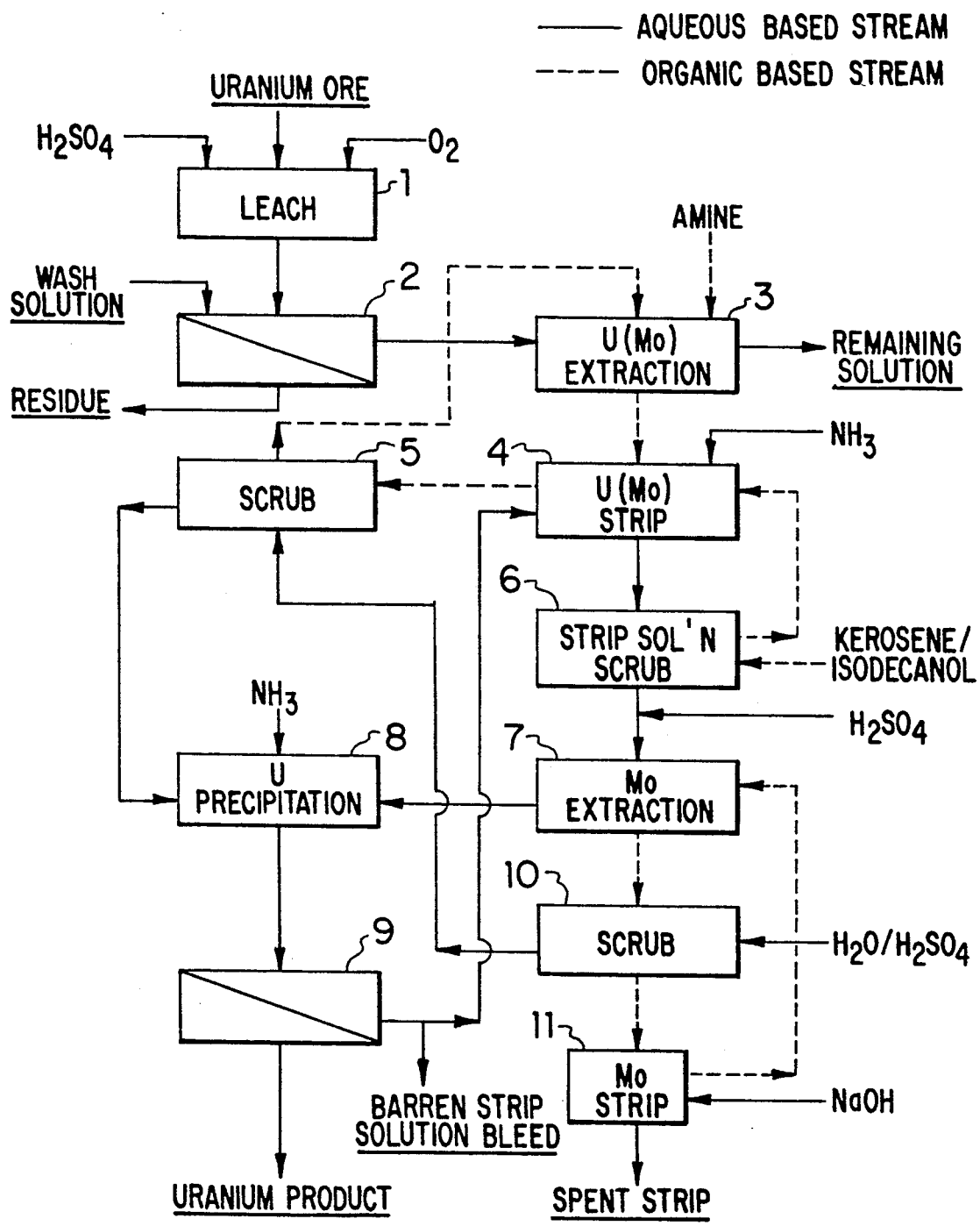
FIG. 2 is a flow diagram showing a second embodiment of the invention, applied in combination with a solvent extraction circuit.

In case the uranium-bearing solution originates from a solvent extraction process, as in the case shown in FIG. 2, an additional pretreatment stage is applied to minimize the contamination of the CHOR circuit by entrained uranium extractant (organic). In accordance with the invention, the uranium-bearing solution containing entrained uranium (organic) extractant is mixed with a kerosene solvent. The aqueous and organic mixture is allowed to separate into its respective phases. The resultant organic contains substantially all the entrained uranium extractant and is recycled to the uranium solvent extraction circuit for reuse. The scrubbed uranium-bearing solution is virtually free of the uranium organic extractant and can be treated with the CHOR organic for molybdenum removal as described above. The pretreatment process can be carried out in a single stage or multiple stages. When multiple stages are used, it is advantageous to arrange the stages in counter current fashion to achieve high scrubbing efficiency.

Figure 4:
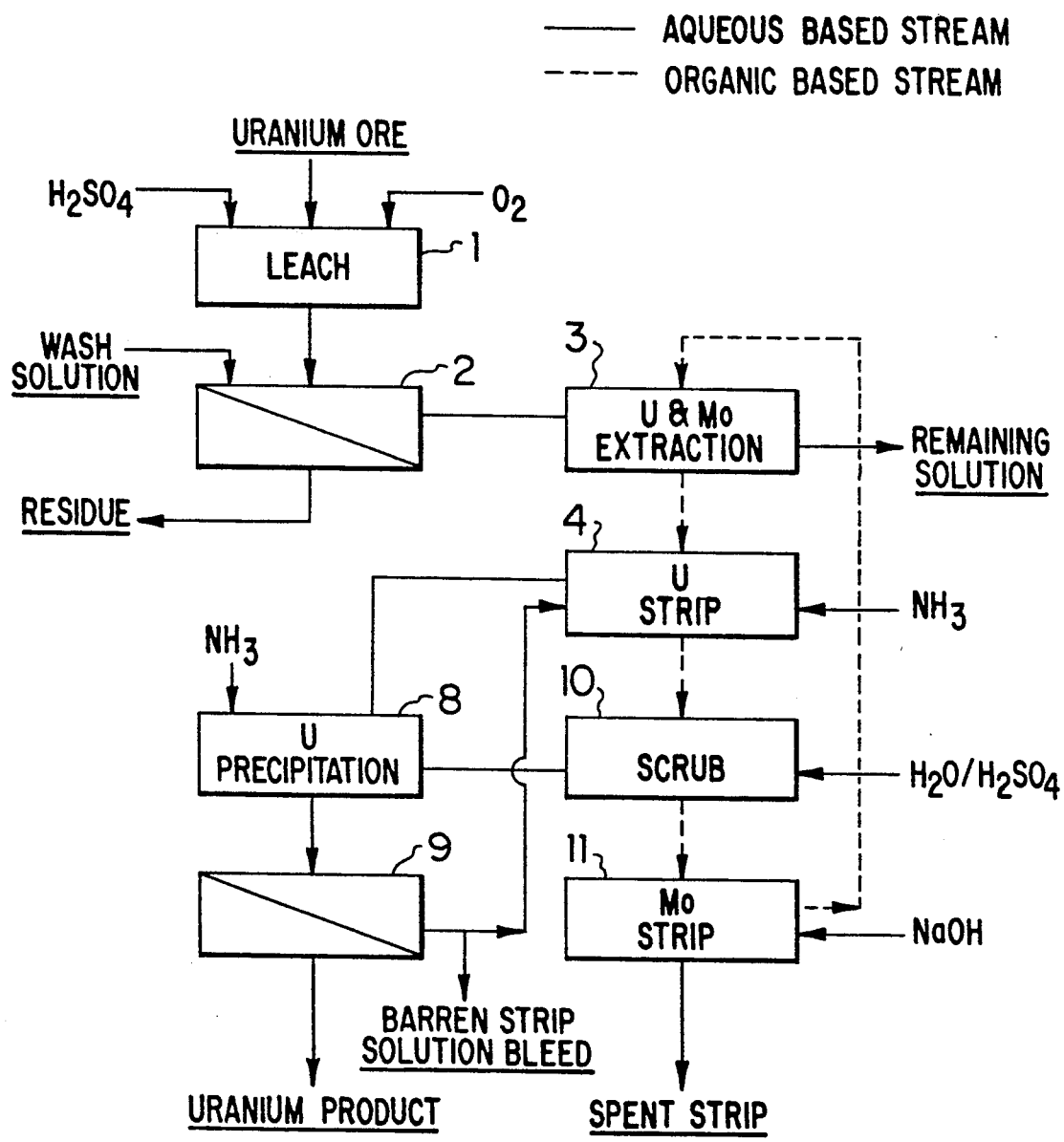
FIG. 4 is a flow diagram showing a fourth embodiment of the invention in which uranium and molybdenum are coextracted from a uranium leach solution.

The embodiment shown in the flow diagram of FIG. 4, consists of extracting uranium and molybdenum from the leach solution with an organic extractant containing both the CHOR and amine. Uranium is selectively stripped from the organic extractant with ammonium sulphate solution at pH range of 3.0–5.5. The resultant strip solution contains uranium and a trace amount of molybdenum. An alkali solution is used to remove the molybdenum from the organic extractant. The spent strip solution containing molybdenum can be treated as desired. The cleaned organic extractant is sent to the extraction stage for reuse.

A person skilled in the art will adjust the organic and aqueous solution flow ratio and/or CHOR concentrations such as to achieve the desired molybdenum separation efficiency.

Figure 1:
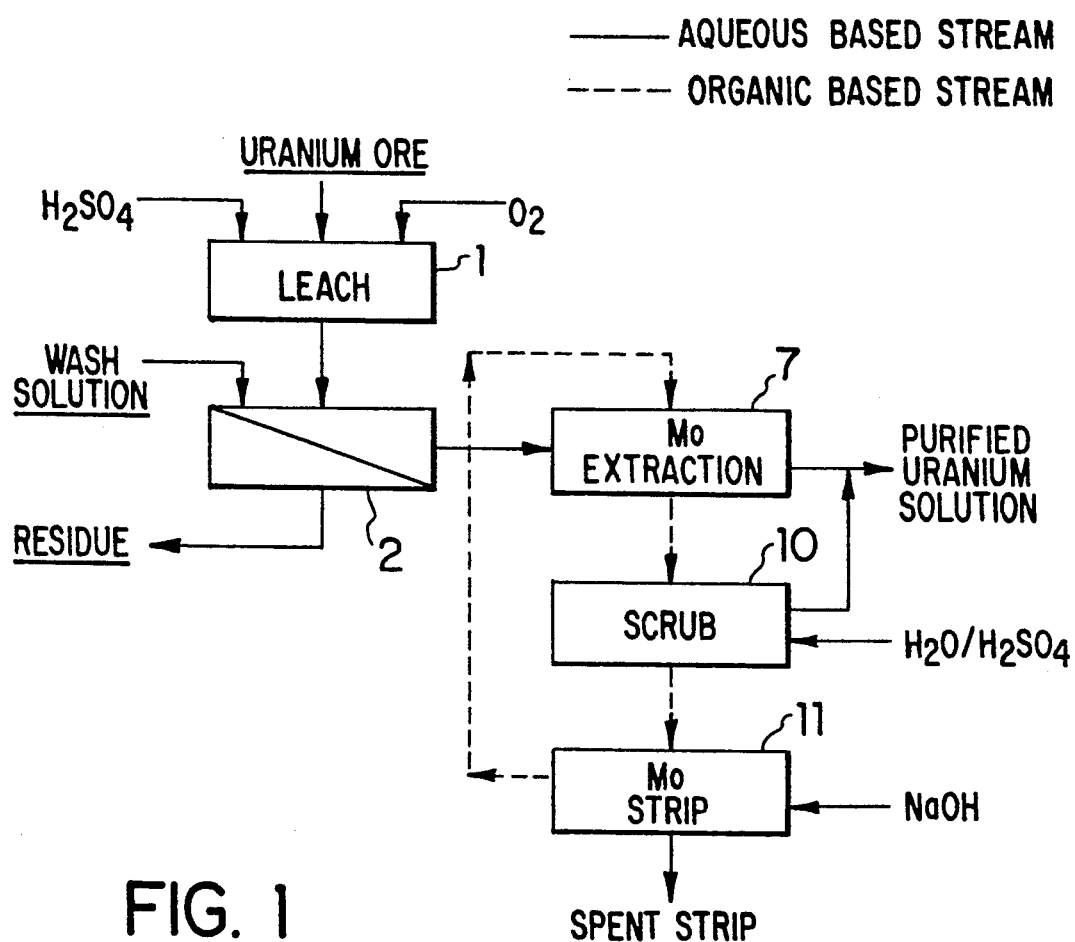
FIG. 1 is a flow diagram of a uranium recovery process according to the invention, applied to uranium leach solutions.

FIG. 1 illustrates an example in which the invention is applied to uranium leach solutions. Uranium ore containing molybdenum and other impurities is leached in step 1 in an aqueous sulphuric acid solution under oxidizing conditions. The resultant slurry is then subjected to a solids/liquid separation and washing in step 2. The solid residue is discarded and the solution product is subjected to a molybdenum extraction stage with an organic stream containing a chelating hydroxy-oxime reagent (CHOR) in step 7. The aqueous product stream from this step is a solution containing uranium and a trace amount of molybdenum. The uranium is recovered by further processing. The CHOR organic from the molybdenum extraction is scrubbed with acidified water in step 10. After this the molybdenum is stripped from the organic with a solution of sodium hydroxide in step 11. The spent strip solution contains the molybdenum and can be treated as desired. The stripped CHOR organic from step 11 is returned to the molybdenum extraction stage (step 7) for reuse as a fresh molybdenum extractant. The scrub aqueous stream from the scrub stage (step 10) joins the aqueous stream from molybdenum extraction in step 7 for further processing.

Referring now to FIG. 2, it shows an example in which the invention is applied in combination with a solvent extraction circuit. Similar to FIG. 1, uranium ore containing molybdenum and other impurities is leached and subjected to a solids/liquid separation and washing (steps 1 and 2). The leach solution is subjected to a uranium and molybdenum extraction stage in step 3. Both the uranium and molybdenum are extracted into an amine organic phase, using, for example, trialkylamine.

The uranium and molybdenum are then stripped from the extractant in step 4 by extraction with ammonium sulphate. The organic extractant is then scrubbed in step 5 with an acidified water solution and returned to the extraction stage (step 3). The product from the strip stage (step 4) is an ammonium sulphate solution containing dissolved uranium and molybdenum. This solution is scrubbed with a kerosene/isodecanol organic stream in step 6 to remove residual amine organic phase. The spent organic stream is used as makeup reagent for the uranium solvent extraction circuit.

The next process step is the selective extraction of the molybdenum from the sulphate solution. This is achieved by adjusting the pH of the sulphate stream with sulphuric acid and contacting the aqueous sulphate stream with an organic stream containing CHOR in step 7. The aqueous product stream from this step is a sulphate solution containing uranium and a trace amount of molybdenum. The uranium is then recovered by precipitation with ammonia in step 8 and a solids/liquid separation stage in step 9. The aqueous stream from precipitation, the barren strip solution, is returned to the uranium and molybdenum strip stage (step 4) for reuse. A portion of the barren strip solution is removed as a bleed to control the ammonia concentration.

The CHOR organic is scrubbed and stripped (steps 10 and 11) as described previously. The scrub aqueous stream from the scrub stage (step 10) is used to scrub the uranium organic in step 5 and then goes to the product precipitation circuit in step 8.

Figure 3:
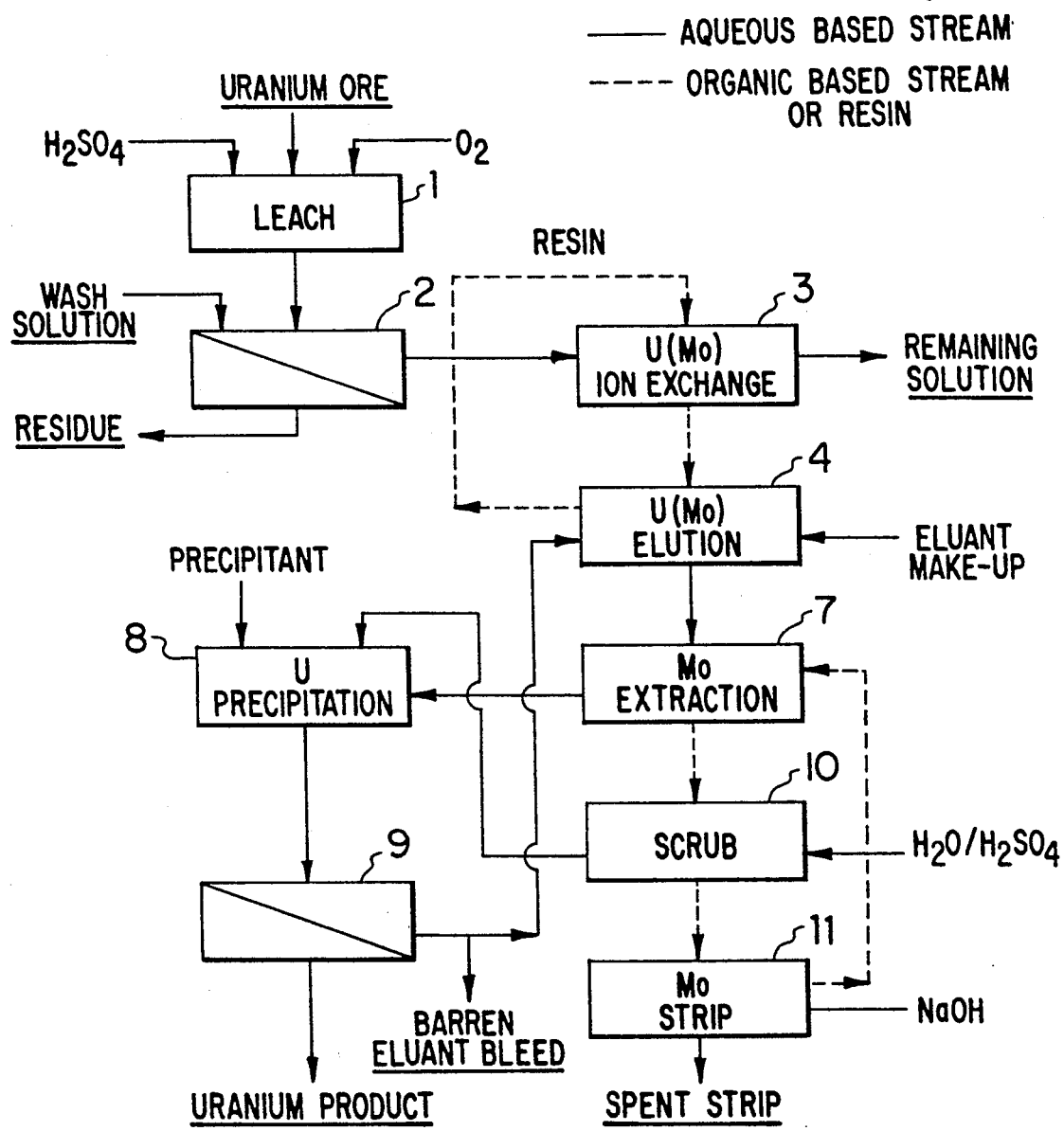
FIG. 3 is a flow diagram showing a third embodiment of the invention, applied in combination with an ion exchange circuit.

FIG. 3 shows an example of the invention in combination with an ion exchange circuit. Many of the steps are identical to those in FIG. 2. The difference in the two flowsheets is that the uranium and molybdenum that was extracted from the leach solution is absorbed by an ion exchange resin (step 3) rather than an organic phase. The uranium and molybdenum is then eluted (stripped) from the ion exchange resin in step 4 by an eluant and the resin is returned to step 3 for reuse while the uranium and molybdenum bearing eluate is forwarded to step 7. The molybdenum removal steps 7, 10, and 11 are identical with those described for FIG. 2. The use of the ion exchange resin rather than the uranium organic extractant in kerosene negates the need for an eluate (strip solution) scrub stage (step 6 in FIG. 2). The other parts of the uranium precipitation and recovery remain the same except that spent scrub solution from step 10 is forwarded directly to the precipitation stage (step 8).

Referring now to FIG. 4, it shows an example of an embodiment of the invention in which the uranium and molybdenum are deliberately coextracted and then selectively stripped from a single organic stream. The ore is leached and the uranium and molybdenum recovered in a leach solution (steps 1 and 2) the same as in the previous flowsheets. Subsequently in step 3 the leach solution is contacted with an organic stream containing a mixture of an amine (for uranium extraction) and the CHOR (for molybdenum extraction).

The uranium is then stripped from the organic stream in step 4 using an aqueous stream of ammonium sulphate solution. Ammonia is added to control the pH between 3.0–5.5. The resultant aqueous stream contains the uranium and a trace amount of the molybdenum. The uranium is then precipitated and recovered from this solution in steps 8 and 9 the same as in the previous flowsheets.

The organic stream from step 4 is scrubbed with an acidic aqueous stream in step 10 to remove any trace of the uranium strip solution. The molybdenum is then stripped from the organic in step 11 by an aqueous stream of sodium hydroxide or similar alkali. This can be treated as desired and the organic mixture is returned to the uranium and molybdenum extraction stage (step 3) for reuse.

EXAMPLE 1

An uranium-bearing solution was obtained by leaching an ore with an oxidant and sulphuric acid. The said solution contained 8.5 kg.m$^{-3}$ (g/L) $U_3O_8$ and 15.8 g.m$^{-3}$ (mg/L) Mo (0.22% Mo on a U basis). In accordance with the invention, the uranium-bearing (aqueous) leach solution was contacted with an organic containing the CHOR extractant. The aqueous and organic mixture was then allowed to separate into its respective phases. The resulted uranium-bearing aqueous solution contained the same amount of uranium but only 0.8 g.m$^{-3}$ (mg/L) Mo (0.01% Mo on a U basis). About 95% of the molybdenum had been removed by the CHOR extractant.

EXAMPLE 2

In accordance with the invention, an ion exchange eluate containing about 100 kg.m$^{-3}$ (g/L) of $H_2SO_4$, 2.2 kg.m$^{-3}$ (g/L) $U_3O_8$ and 4.8 g.m$^{-3}$ (mg/L) Mo (0.26% Mo on a U basis) was contacted with the CHOR extractant. The resultant aqueous solution contained the same amount of uranium but only 0.1 g.m$^{-3}$ (mg/L) Mo (0.01% Mo on a U basis). About 98% of the molybdenum had been removed.

EXAMPLE 3

Another ion exchange eluate solution was prepared which contained 2.0 kg.m$^{-3}$ (g/L) $U_3O_8$ and 235 g.m$^{-3}$ (mg/L) Mo (14.2% Mo on a U basis). In accordance with the invention, the eluate aqueous solution was contacted with the CHOR extractant. The resultant aqueous solution contained the same amount of uranium but only 0.1 g.m$^{-3}$ (mg/L) Mo (0.01% Mo on a U basis). About 99% of the molybdenum had been removed.

EXAMPLE 4

A loaded strip solution from a conventional uranium solvent extraction plant contained typically 40 kg.m$^{-3}$ (g/L) $U_3O_8$ and 39 g.m$^{-3}$ (mg/L) Mo (0.115% Mo on a U basis). A continuous pilot plant test at 2 m$^3$.h$^{-1}$ aqueous flow rate was operated in which, in accordance with the invention, the said loaded strip solution was contacted with the CHOR extractant at a pH less than 3. The resultant aqueous solution contained the same amount of uranium and typically 17 g.m$^{-3}$ (mg/L) Mo (0.05% Mo on a U basis).

EXAMPLE 5

During the same pilot plant test described in Example 4, the molybdenum-loaded CHOR organic was contacted with a dilute caustic solution to effect the molybdenum stripping. The barren CHOR extractant as re-used to extract molybdenum. The loaded CHOR extractant typically contained 227 g.m$^{-3}$ (mg/L) Mo. The barren CHOR extractant typically contained 14 g.m$^{-3}$ (mg/L) Mo.

EXAMPLE 6

A uranium-bearing leach solution was contacted with an organic mixture of the CHOR extractant and a tertiary amine. The said uranium-bearing solution contained 8.5 kg.m$^{-3}$ (g/L) of $U_3O_8$ and 15.8 g.m$^{-3}$ (mg/L) of Mo (0.22% Mo on a U basis). The organic mixture extracted uranium and molybdenum from the leach solution to yield a uranium and molybdenum depleted solution of 0.13 kg.m$^{-3}$ (g/L) $U_3O_8$ and 0.7 g.m$^{-3}$ (mg/L) Mo.

The uranium was stripped from the loaded organic mixture with ammonium sulphate solution at pH 4.8. The resulting loaded strip solution contained 10.58 kg.m$^{-3}$ (g/L) $U_3O_8$ and 0.3 g.m$^{-3}$ (mg/L) Mo (0.003% Mo on a U basis). The organic was then contacted with a dilute caustic solution to effect the molybdenum stripping. The barren organic mixture contained 0.8 kg.m$^{-3}$ (g/L) $U_3O_8$ and 0.6 g.m$^{-3}$ (mg/L) Mo which was ready for reuse.

Other embodiments of the invention will be apparent to a person skilled in the art, the scope of the invention being defined in the appended claims.

What is claimed is:

1. A process for separating molybdenum from uranium in an acidic aqueous solution containing dissolved uranium and molybdenum comprising reacting said solution with an effective chelating hydroxy-oxime reagent which is immiscible with said aqueous solution, to extract said molybdenum by solvent extraction into said reagent, leaving said uranium dissolved in said aqueous solution.

2. A process according to claim wherein said reagent is an aliphatic hydroxy-oxime reagent.

3. A process according to claim 1 wherein said reagent is an aromatic hydroxy-oxime reagent.

4. A process according to claim 1 wherein said reagent comprises 5, 8-diethyl-7-hydroxydodecane-6-oxime.

5. A process according to claim 1, wherein the pH of said solution is less than about 5.

6. A process according to claim 6 wherein the pH of said solution is less than about 3.

7. A process according to claim 1, wherein said solution is an aqueous leach solution produced by leaching uranium ore with acid, and separating and washing the liquid phase resulting therefrom.

8. A process according to claim 7 wherein the pH of said solution is less than about 5.

9. A process according to claim 1, wherein said solution is an aqueous strip solution produced by solvent extraction with amine of a uranium- and molybdenum-containing leach solution.

10. A process according to claim 9 including the step, prior to reacting said solution with said reagent, of scrubbing said solution with an organic phase to remove residual amine.

11. A process according to claim 10 wherein said organic phase comprises kerosene.

12. A process according to claim 1, wherein said solution is an aqueous eluate produced by ion exchange extraction of uranium and molybdenum from a leach solution.

13. A process according to claim 1, or 11 including the further step, following reaction of said solution with said reagent, of reacting said reagent containing extracted molybdenum with an alkali solution to strip the molybdenum therefrom, leaving said reagent available for reuse.

14. A process according to claim 13 wherein said reagent containing extracted molybdenum is scrubbed with water prior to molybdenum stripping.

15. A process according to claim 13 wherein said reagent containing extracted molybdenum is scrubbed with dilute acid prior to molybdenum stripping.

16. A process according to claim 13 wherein the pH of said solution is less than about 5.

17. A process according to claim 13 wherein the pH of said solution is less than about 3.

18. A process according to claim 13 wherein said reagent containing extracted molybdenum is reacted with said alkali solution at a pH of about 10–14.

19. A process according to claim 13 wherein said reagent containing extracted molybdenum is reacted with said alkali solution at a pH of about 11–13.

20. A process for separating molybdenum from uranium in an acidic aqueous solution containing dissolved uranium and molybdenum comprising the steps of:
   a) reacting said solution with a mixture of an effective chelating hydroxy-oxime reagent and a tertiary amine, said mixture being immiscible with said acidic aqueous solution, to extract said molybdenum and uranium into said mixture by solvent extraction, whereby said molybdenum is extracted by said hydroxy-oxime component of said mixture and said uranium is extracted by said tertiary amine component of said mixture; and
   b) stripping said uranium and molybdenum selectively in separate subsequent steps from said reacted mixture.

21. A process according to claim 20 wherein said reagent is an aliphatic hydroxy-oxime reagent.

22. A process according to claim 20 wherein said reagent is an aromatic hydroxy-oxime reagent.

23. A process according to claim 20 wherein said reagent comprises 5, 8-diethyl-7-hydroxydodecane-6-oxime.

24. A process according to claim 20, wherein said stripping of uranium is done by contacting said reacted mixture with an aqueous solution of ammonium sulphate at a pH of about 3–5.5.

25. A process according to claim 20 wherein said stripping of molybdenum is done by reacting said mixture with dilute alkali solution.

26. A process according to claim 25 further comprising the step of scrubbing said reacted mixture after said stripping of uranium and before said stripping of molybdenum with an acidic aqueous solution to remove residual uranium strip solution.

* * * * *